(12) United States Patent
Gentsch et al.

(10) Patent No.: US 11,271,375 B2
(45) Date of Patent: Mar. 8, 2022

(54) EARTHING MODULE

(71) Applicant: ABB Schweiz AG, Baden (CH)

(72) Inventors: Dietmar Gentsch, Ratingen (DE); Christian Reuber, Willich (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/402,636

(22) Filed: Aug. 16, 2021

(65) Prior Publication Data

US 2021/0376579 A1 Dec. 2, 2021

Related U.S. Application Data

(63) Continuation of application No. PCT/EP2020/054206, filed on Feb. 18, 2020.

(30) Foreign Application Priority Data

Feb. 18, 2019 (EP) ..................... 19157860

(51) Int. Cl.
*H01H 33/28* (2006.01)
*H01H 33/666* (2006.01)
*H02B 13/075* (2006.01)

(52) U.S. Cl.
CPC .......... *H02B 13/075* (2013.01); *H01H 33/28* (2013.01); *H01H 33/666* (2013.01); *H01H 2033/6667* (2013.01)

(58) Field of Classification Search
CPC .... H02B 13/075; H02B 13/045; H01H 33/28; H01H 33/26; H01H 33/666; H01H 2033/6667; H01H 9/50; H01H 31/003; H01H 1/06; H01H 1/14; H01H 79/00; H01H 39/002; H01H 39/006; H02H 1/0023
USPC ............ 218/79, 12, 45, 55, 67, 80; 361/220; 200/402
See application file for complete search history.

(56) References Cited

U.S. PATENT DOCUMENTS

| 5,089,931 | A | 2/1992 | Thuries et al. | |
| 6,518,865 | B1 * | 2/2003 | Al-Hosini | H01H 33/285 335/147 |
| 9,318,294 | B2 * | 4/2016 | Karlsson | H01H 31/24 |
| 9,773,628 | B2 * | 9/2017 | Fukuyama | H01H 39/006 |

(Continued)

FOREIGN PATENT DOCUMENTS

| EP | 0382134 A1 | 8/1990 |
| FR | 2731520 A1 | 9/1996 |

*Primary Examiner* — William A Bolton
(74) *Attorney, Agent, or Firm* — Leydig, Voit & Mayer, Ltd.

(57) ABSTRACT

An earthing module for a switchgear includes: a cylinder; a piston; a stored energy unit; and at least one photovoltaic cell. The cylinder connects to a part of a switchgear at earth potential. The piston moves within the cylinder from a standby position to a released position along an axis of the cylinder. When in the released position, the piston is in electrical connection with the cylinder. The stored energy unit is located within or associated with the earthing module such that activation of the stored energy unit moves the piston from the standby position to the released position. One or more of the at least one photovoltaic cell activates the stored energy unit based on radiation from an electrical arc of the switchgear impinging upon the one or more of the at least one photovoltaic cell.

31 Claims, 10 Drawing Sheets

(56) References Cited

U.S. PATENT DOCUMENTS

| | | | |
|---|---|---|---|
| 9,842,717 B2* | 12/2017 | Jeong | H01H 71/2481 |
| 9,905,383 B2* | 2/2018 | Hori | B60L 3/0007 |
| 2003/0231453 A1 | 12/2003 | Shea | |
| 2005/0083164 A1* | 4/2005 | Caruso | H01H 39/006 |
| | | | 337/157 |

* cited by examiner

EARTHING MODULE

CROSS-REFERENCE TO PRIOR APPLICATION

This application is a continuation of International Patent Application No. PCT/EP2020/054206, filed on Feb. 18, 2020, which claims priority to European Patent Application No. EP 19157860.8, filed on Feb. 18, 2019. The entire disclosure of both applications is hereby incorporated by reference herein.

FIELD

The present invention relates to an earthing module for a switchgear, such as an air-insulated switchgear or a gas-insulated switchgear for low, medium and high voltage applications.

BACKGROUND

For the limitation of the effects of a fault arc inside a switchgear panel, it is desirable to quickly establish a stable current path from the conductor to ground, so that the fault arc is short-circuited and so quenched. To address this fast earthing systems are used. These use stored energy, for example from springs or micro gas generators, and are triggered by a control device depending on for example the magnitude of the current, the rate of rise of the current and/or the light emitted by the fault arc. The control device or module can be expensive, and these systems are powered by auxiliary energy, which can impact the availability of the system. This impacts assembly of the switchgear panel due to the necessary wiring, increases costs.

There is a need to address this issue.

SUMMARY

In an embodiment, the present invention provides an earthing module for a switchgear, the earthing module comprising: a cylinder; a piston; a stored energy unit; and at least one photovoltaic cell, wherein the cylinder is configured to connect to a part of a switchgear at earth potential, wherein the piston is configured to move within the cylinder from a standby position to a released position along an axis of the cylinder, wherein, when in the released position, the piston is configured to be in electrical connection with the cylinder, wherein the stored energy unit is located within or associated with the earthing module such that activation of the stored energy unit is configured to move the piston from the standby position to the released position, and wherein one or more of the at least one photovoltaic cell is configured to activate the stored energy unit based on radiation from an electrical arc of the switchgear impinging upon the one or more of the at least one photovoltaic cell.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
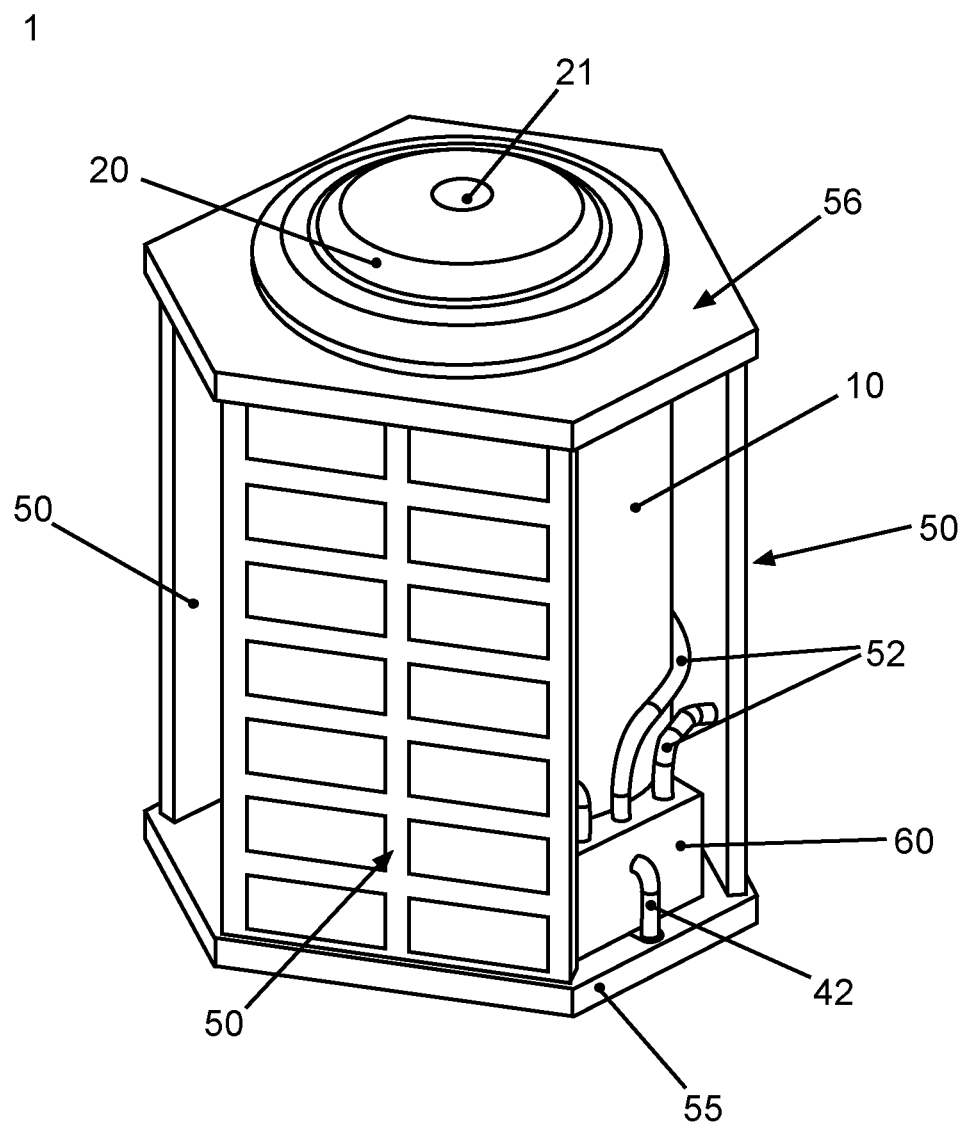
FIG. 1 shows an example of an earthing module.

In an embodiment, the present invention provides an improved ability to limit the effects of a fault arc in a switchgear panel, hereafter referred to as switchgear.

In a first aspect, there is provided an earthing module for a switchgear, the earthing module comprising:

a cylinder;
a piston;
a stored energy unit; and
at least one photovoltaic cell.

The cylinder is configured to connect to a part of a switchgear at earth potential. The piston is configured to move within the cylinder from a standby position to a released position along an axis of the cylinder. When in the released position the piston is configured to be in electrical connection with the cylinder. The stored energy unit is located within or associated with the earthing module such that activation of the stored energy unit is configured to move the piston from the standby position to the released position. One or more of the at least one photovoltaic cell is configured to activate the stored energy unit on the basis of radiation from an electrical arc of the switchgear impinging upon the one or more of the at least one photovoltaic cell.

In an example, a tip of the piston when in the released position is configured to make electrical connection with at least one current carrying part of the switchgear.

In an example, the tip of the piston is pointed, or spiked.

In an example, the tip of the piston is configured such that as the piston moves from the standby position to the released position the tip can intrude through an earthed layer and insulation of a cable and make electrical contact with a main conductor of the cable.

In an example, the tip comprises a contact bridge with two or more contact pieces. Each contact piece of the two or more contact pieces is configured to make electrical connection with a different current carrying part of the switchgear when the piston is in the released position.

In an example, gas from the stored energy unit is configured to move the piston from the standby position to the released position upon activation of the stored energy unit.

In an example, the stored energy unit comprises a micro gas generator or a pressurized gas container.

In an example, the stored energy unit comprises one or more springs. Expansion of the one or springs is configured to move the piston from the standby position to the released position upon activation of the stored energy unit.

In an example, the piston comprises an electrical contact that is configured to slide along an inner surface of the cylinder and make electrical connection between the piston and the cylinder.

In an example, the electrical contact is configured to maintain the electrical connection when the piston moves from the standby position to the released position. Thus, the electrical connection is maintained whilst the piston is moving, and thus the earthing module can provide the required earthing protection before the end stroke to the released position is reached.

In an example, the cylinder comprises a groove configured to accommodate the electrical contact when the piston is in the standby position.

In an example, the groove and electrical contact are configured to lock the piston in the standby position until activation of the stored energy unit.

In an example, the piston and cylinder are configured such that in the released position a portion of the outer surface of the piston is in contact with a portion of the inner surface of the cylinder.

In an example, the portion of the outer surface of the piston and the portion of the inner surface of the cylinder are shaped such that in moving from the standby position to the released position the piston is locked in the released position.

In an example, the portion of the outer surface of the piston is conically shaped and the portion of the inner surface of the cylinder is conically shaped.

In an example, the at least one photovoltaic cell is mounted to a wall of the cylinder with active surfaces facing outwards from the axis of the cylinder.

In an example, a rated voltage of the at least one photovoltaic cell is equal to a rated voltage of a triggering device of the stored energy unit.

In an example, the at least one photovoltaic cell and the stored energy unit are configured such that radiation below a threshold intensity level is not sufficient to activate the stored energy unit.

In an example, an electrical connection block connects the at least one photovoltaic cell directly to the stored energy unit. In case there are cables from more than one photovoltaic cell to be connected to the cables of the stored energy unit this can be done inside of the electrical connection block.

In an example, an electrical connection block connects the at least one photovoltaic cell to the stored energy unit. The electrical connection block comprises an electrical threshold switch configured to inhibit relatively small currents from activating the stored energy unit.

In an example, an electrical connection block connects the at least one photovoltaic cell to the stored energy unit. The electrical connection block comprises an electrical time filter configured to inhibit very short disturbances from activating the stored energy unit.

In an example, the earthing module comprises a current sensor configured to detect a current in the vicinity of the earthing module.

In an example, the current sensor comprises a hall sensor, a reed sensor, or a coil.

In an example, the at least one photovoltaic cell, prior to the earthing module being operational, is covered with a removable opaque covering.

In an example, the opaque covering comprises a colored portion.

In an example, the opaque covering comprises foil.

In an example, the tip of the piston is comprised within a part of the piston that is moveable with respect to the rest of the piston. A spring is configured to push the moveable part of the piston away from the rest of the piston.

In an example, movement of the moveable part of the piston away from the rest of the piston is limited.

In an example, the movement is limited via a screw that connects the moveable part of the piston to the rest of the piston.

In an example, the piston is configured such that when the moveable part of the piston moves with respect to the rest of the piston an electrical connection is maintained between the moveable part of the piston and the rest of the piston.

In an example, the electrical connection is maintained via a slidable contact.

In a second aspect, there is provided a switchgear comprising one or more earthing modules according to the first aspect.

The above aspects and examples will become apparent from and be elucidated with reference to the embodiments described hereinafter.

FIGS. 1-10 relate to earthing modules for a switchgear, such as a low, medium or high voltage switchgear. In an example the earthing module comprises cylinder 10, a piston 20, a stored energy unit 40 and at least one photovoltaic cell 50. The cylinder is configured to connect to a part of a switchgear at earth potential. The piston is configured to move within the cylinder from a standby position to a released position along an axis of the cylinder. When in the released position the piston is configured to be in electrical connection with the cylinder. The stored energy unit is located within or associated with the earthing module such that activation of the stored energy unit is configured to move the piston from the standby position to the released position. One or more of the at least one photovoltaic cell is configured to activate the stored energy unit on the basis of radiation from an electrical arc of the switchgear impinging upon the one or more of the at least one photovoltaic cell.

According to an example, a tip 21 of the piston when in the released position is configured to make electrical connection with at least one current carrying part of the switchgear.

According to an example, the tip of the piston is pointed.

According to an example, the tip of the piston is configured such that as the piston moves from the standby position to the released position the tip can intrude through an earthed layer 73 and insulation 72 of a cable 70 and make electrical contact with a main conductor 71 of the cable.

According to an example, the tip comprises a contact bridge 35 with two or more contact pieces 36. Each contact piece of the two or more contact pieces is configured to make electrical connection with a different current carrying part of the switchgear when the piston is in the released position.

According to an example, gas from the stored energy unit is configured to move the piston from the standby position to the released position upon activation of the stored energy unit. Thus, expanding gas and/or the release of gas, is used to move the piston within the cylinder.

According to an example, the stored energy unit comprises a micro gas generator or a pressurized gas container.

According to an example, the stored energy unit comprises one or more springs. Expansion of the one or springs is configured to move the piston from the standby position to the released position upon activation of the stored energy unit. Expansion of a spring here means extension of a spring that was compressed.

According to an example, the piston comprises an electrical contact 30 that is configured to slide along an inner surface of the cylinder and make electrical connection between the piston and the cylinder.

According to an example, the electrical contact is configured to maintain the electrical connection when the piston moves from the standby position to the released position. Thus, an electrical connection can be maintained whilst the piston is moving.

According to an example, the cylinder comprises a groove 14 configured to accommodate the electrical contact 30 when the piston is in the standby position.

According to an example, the groove and electrical contact are configured to lock the piston in the standby position until activation of the stored energy unit.

According to an example, the piston and cylinder are configured such that in the released position a portion of the outer surface 22 of the piston is in contact with a portion of the inner surface 12 of the cylinder.

According to an example, the portion of the outer surface 22 of the piston and the portion of the inner surface 12 of the cylinder are shaped such that in moving from the standby position to the released position the piston is locked in the released position.

According to an example, the portion of the outer surface 22 of the piston is conically shaped and the portion of the inner surface 12 of the cylinder is conically shaped. Thus, there are a number of different shapes that can lock together, with for example various forms of tapering, one of which is conical.

According to an example, the at least one photovoltaic cell is mounted to a wall of the cylinder with active surfaces facing outwards from the axis of the cylinder.

According to an example, a rated voltage of the at least one photovoltaic cell is equal to a rated voltage of a triggering device of the stored energy unit.

According to an example, the at least one photovoltaic cell and the stored energy unit are configured such that radiation below a threshold intensity level is not sufficient to activate the stored energy unit.

According to an example, an electrical connection block 60 connects the at least one photovoltaic cell to the stored energy unit. The electrical connection block may comprise an electrical threshold switch configured to inhibit relatively small currents from activating the stored energy unit. Additionally or alternatively the electrical connection block comprises an electrical time filter configured to inhibit very short disturbances from activating the stored energy unit.

A small current here means a current below that expected from the at least one photovoltaic cell when detecting an electrical arc. A very short disturbance here means an electrical disturbance of a duration less than that expected from the at least one photovoltaic cell when detecting an electrical arc.

According to an example, the earthing module comprises a current sensor configured to detect a current in the vicinity of the earthing module.

According to an example, the current sensor comprises a hall sensor, a reed sensor, or a coil.

According to an example, the at least one photovoltaic cell is covered with a removable opaque covering. This can be applied during manufacture of the earthing module, and helps safeguard against unwanted activation of the earthing unit—Once installed in position, and ready for priming for use, the opaque covering or layer can then be removed. Opaque here refers to opacity to the radiation that the photovoltaic cell(s) can detect and that could lead to activation of the earthing module.

According to an example, the opaque covering comprises a colored portion.

According to an example, the opaque covering comprises foil.

According to an example, the tip of the piston is comprised within a part 25 of the piston that is moveable with respect to the rest of the piston 24. A spring 27 is configured to push the moveable part of the piston away from the rest of the piston.

According to an example, movement of the moveable part of the piston away from the rest of the piston is limited.

According to an example, the movement is limited via a screw 28 that connects the moveable part of the piston to the rest of the piston.

According to an example, the piston is configured such that when the moveable part 25 of the piston moves with respect to the rest of the piston 24 an electrical connection is maintained between the moveable part 25 of the piston and the rest of the piston.

According to an example, the electrical connection is maintained via a slidable contact.

Thus, the above examples also relate to a switchgear comprising one or more earthing modules as described above.

Thus, as described above an independent earthing module with a stored energy unit and an integrated photovoltaic cell is provided. The electrical energy that is generated by the photovoltaic cell due to the excessive light of a fault arc is sufficient to trigger the stored energy unit and thereby releasing the stored energy, so that an arc fault itself results in a fast earthing action. The fault arc is then quenched in a few milliseconds and the prospective deterioration due to the fault arc, inside and outside of the switchgear, is reduced. The short circuit current can then be switched off by an external circuit breaker. The earthing module is independent from electrical energy stored in capacitors, batteries or accumulators, and it is also independent from any external auxiliary energy.

Figure 2:
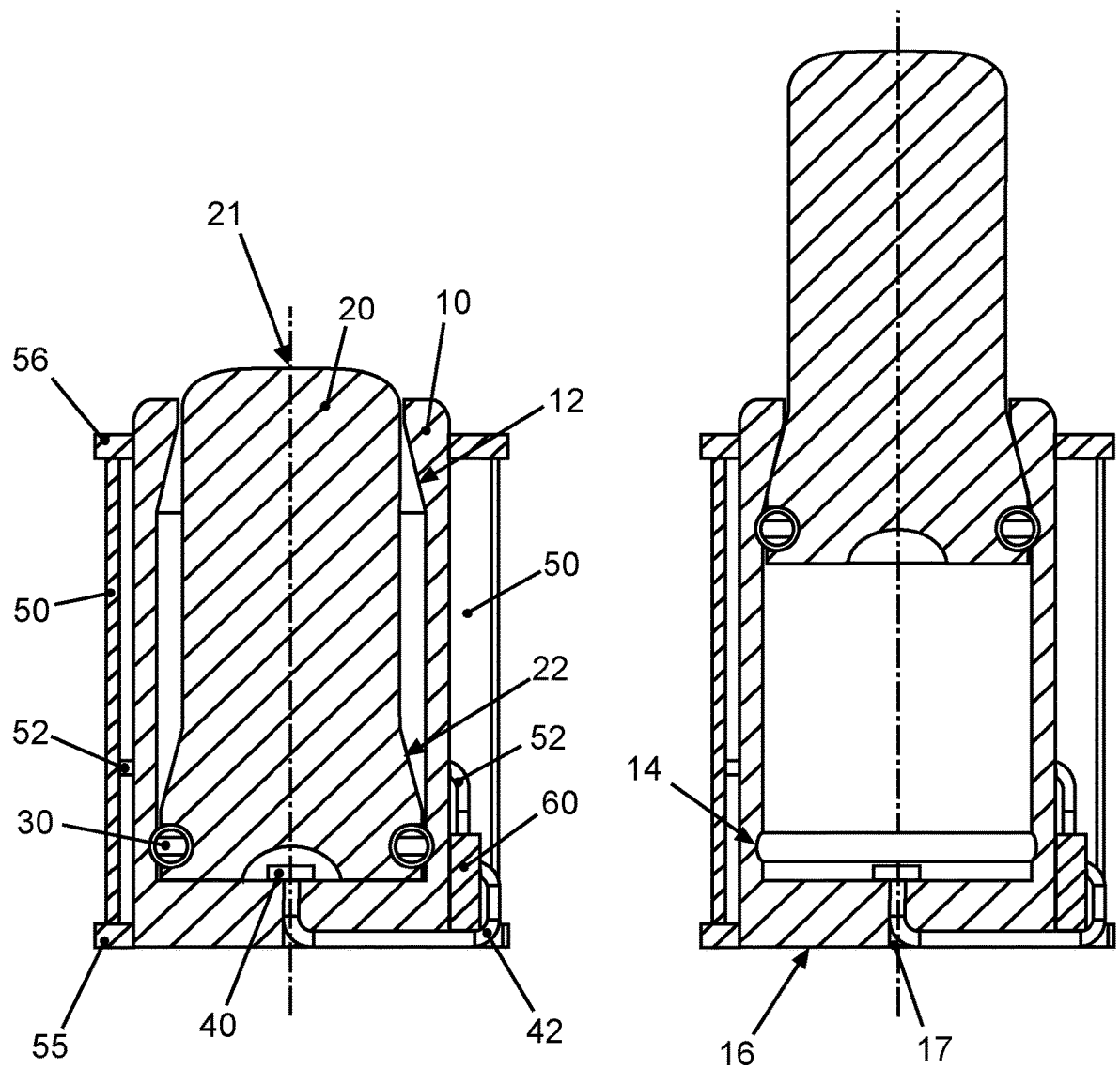
FIG. 2 shows sectional views of an example of an earthing module in standby and released positions.

Continuing with the figures, several embodiments are now described in detail. FIG. 1 shows an earthing module 1 from the outside, while FIG. 2 shows sectional views of the earthing module 1 in standby and in the released position. A piston 20 is guided inside of a cylinder 10. The bottom side 16 of the cylinder 10 is connected to earth potential, for example by screwing, in a way that a high current can flow. A slidable electrical contact 30, for example a spiral contact, realizes a stable current path between the cylinder 10 and the piston 20. In the standby position, as shown in FIG. 2, the piston 20 is almost fully inside the cylinder 10. In the released position, as shown in FIG. 2 the piston 20 extends upwards outside of the cylinder with the purpose of earthing the part of the switchgear that is touched by the tip 21 of the plunger or piston 20.

The piston 20 is locked in the standby position by a slidable electrical contact 30 that rests in a grove 14 of the cylinder 10. The independent earthing module is brought from the standby position to the released position by triggering of a stored energy unit 40 and the release of energy from the stored energy unit 40. The stored energy unit 40 can for example be a micro gas generator or a pressurized air container, and indeed can be spring driven. The force generated by the stored energy unit 40, for example from the release or generation of gas, drives the piston 20 upwards, until the conical shape 22 at the outer side of the piston 20 hits the conical shape 12 at the inner side of the cylinder 10. Due to the actual shapes of 12 and 22, and due to the speed of the mechanical impact, the piston 20 is clamped and locked to the cylinder 10, so that the released position of the independent earthing module 1 is maintained even when the force peak generated by the stored energy unit 40 has been reached and the peak force then subsides. Thus, the released position can be maintained against external forces.

The bottom side 16 of the cylinder and of the independent earthing module 1 is designed to be screwed onto earthed surfaces or earthing bars that are able to carry the high short circuit current for the defined time. Therefore, the bottom side 16 is provided with for example threaded holes and a flat outer surface. For achieving the flat surface, a groove 17 is used for guiding the electrical wiring 42 of the stored energy unit 40. This is just one specific example, and other examples of the earthing module can be attached within the switchgear as required.

The independent earthing module 1 further comprises at least one photovoltaic cell 50 at its outside. The embodiment shown in FIGS. 1 and 2 comprises three photovoltaic cells at the outside of the earthing module 1. The active sides of the photovoltaic cells are directed towards the outside of the independent earthing module, while their cable connections 52 are directed towards the inside. The photovoltaic cells are mechanically connected to the cylinder 10 by mechanical support parts 55, 56 in this embodiment. All electrical wirings 52 of the photovoltaic cells are connected to the electrical wiring 42 of the stored energy unit 40. In this embodiment, an electrical connection block 60 is used for that purpose. Photovoltaic cells can be connected in parallel or in series, dependent upon the actual design of the module. In an advantageous embodiment the rated voltages of the photovoltaic cell or cells are matched to the rated voltage of the triggering device of the stored energy unit, and when several photovoltaic cells are used in one independent earthing module, the cells can be connected in parallel.

In general, photovoltaic cells are rated for the regular solar radiation on earth. However, these cells deliver more electrical energy when the intensity of the light is higher than the intensity of the solar light on earth, as it is the case with electrical fault arcs in low voltage (LV), medium voltage (MV) and high voltage (HV) switchgear. Also the cells that are not directly exposed to the light of the fault arc generate electrical energy from reflected light, especially when considering that switchgear compartment walls usually have shiny metallic surfaces. Therefore, it is feasible to generate sufficient electrical energy to trigger the stored energy unit even with a limited area that is available for the photovoltaic cells. An advantageous option is the installation of further metallic surfaces or mirrors around the independent earthing module with the intention to increase the amount of light that reaches the photovoltaic cells. This can especially be the case, when typical fault arc locations are known and the earthing module and photovoltaic cells and reflecting surfaces, if necessary, can be located appropriately. Thus, those cells that are not directly exposed to the fault arc in these known or typical cases can also receive radiation, from such reflecting surfaces.

The design of the earthing module can be controlled in order to avoid unwanted triggering of the earthing function. This ensures that artificial light in factories or even direct solar radiation is not sufficient to trigger the stored energy unit. Furthermore, an electrical threshold switch can be integrated in the earthing module, for example inside the electrical connection block 60, to avoid relatively small currents running through the triggering device of the stored energy unit for a longer time or to cope with tolerances of the triggering device of the stored energy unit. Furthermore, an electrical time filter can be integrated in the earthing module, for example inside the electrical connection block 60, to avoid very short disturbances, like small flashovers that can occur when disconnectors are operated, triggering the release of the stored energy unit.

The independent earthing module can be utilized in all areas of a switchgear, except compartments where disconnectors are being operated if necessary. The independent earthing module can also have, or be combined with, means to detect a high current or a high current rise in its vicinity. Such a current sensor can for example be a hall sensor, a reed contact or a coil. These means can for example be integrated in the electrical connection block. The purpose of detecting a high current or a high rate of rise of a current is in order to provide a better differentiation between light, disconnector operation and real fault arcing. This ensures that the independent earthing module is only released in the case of real fault arcing. Furthermore, the photovoltaic cells can be covered with an opaque foil that is not to be removed before the commissioning of the switchgear. A signal color can be applied at the outside of the foil to make it obvious in production that the foil is still there.

Figure 3:
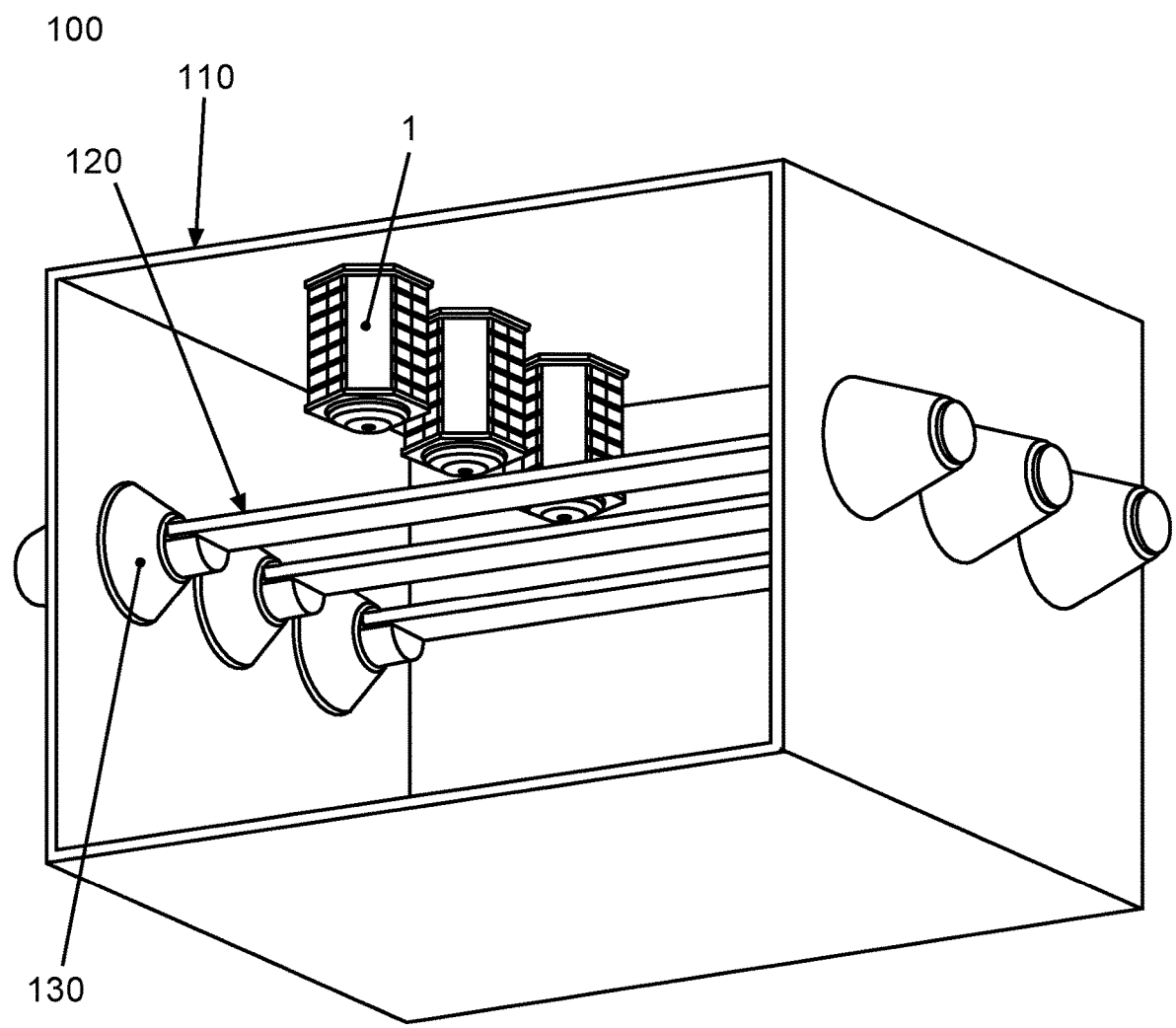
FIGS. 3 and 4 show examples of three earthing modules in a part of a switchgear, in standby and released positions.
Figure 4:
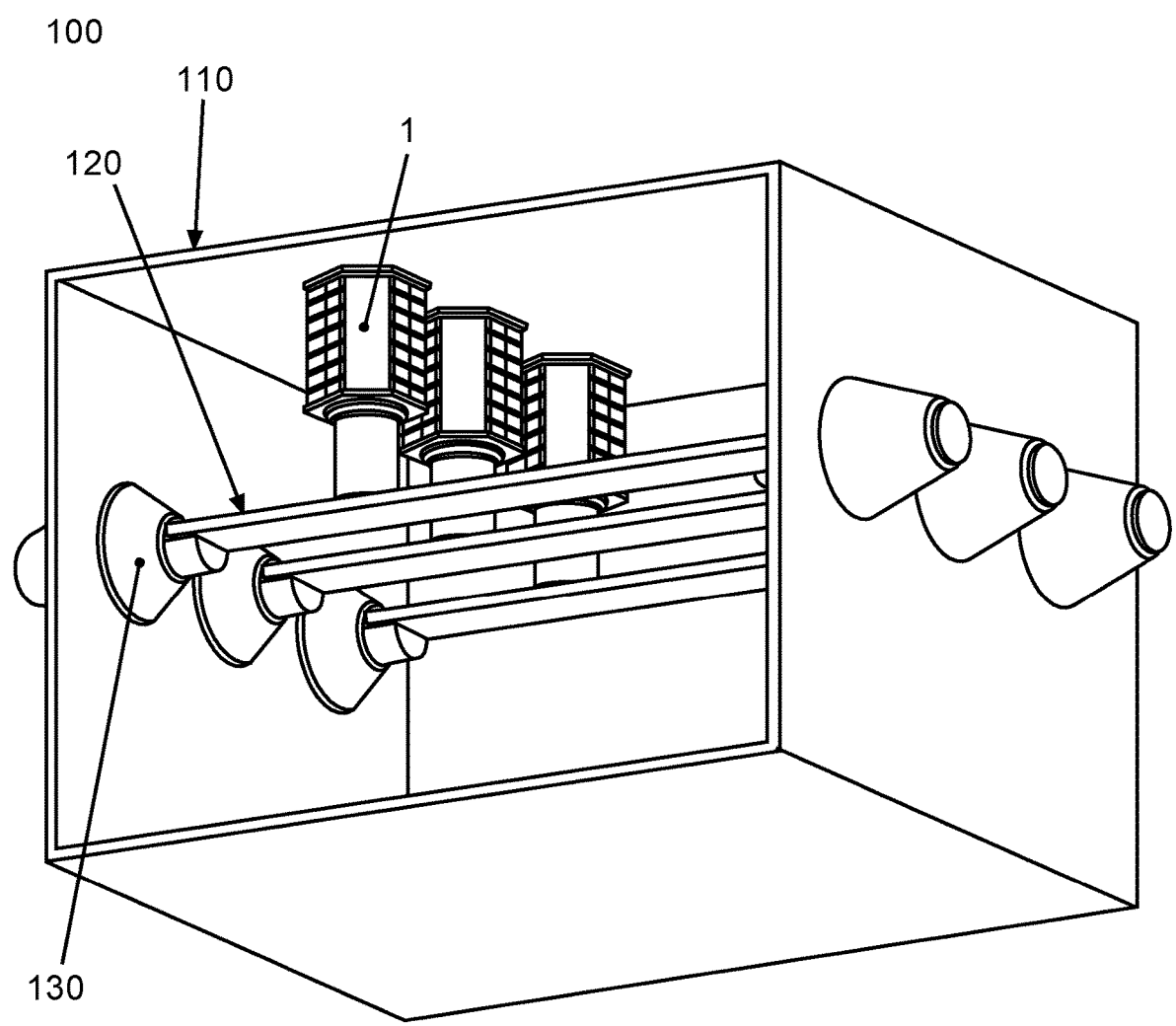

FIGS. 3 and 4 show three independent earthing modules in a sample compartment 100. The actual purpose of this compartment does not matter; it can for example be a busbar compartment with a tap. The design and the tolerances of the compartment foresee that the distance that the piston has to move or bypass from the standby position until it touches the busbar 120 is lower than the total stroke of the piston, with the effect that the piston, that is driven by the strong force of the stored energy unit, will push the busbar 120 and the side of the enclosure 110 where the independent earthing module is installed away from each other. In that case, the busbar and the enclosure act like springs that generate the required contact force for a stable current path from the busbar to earth.

Figure 5:
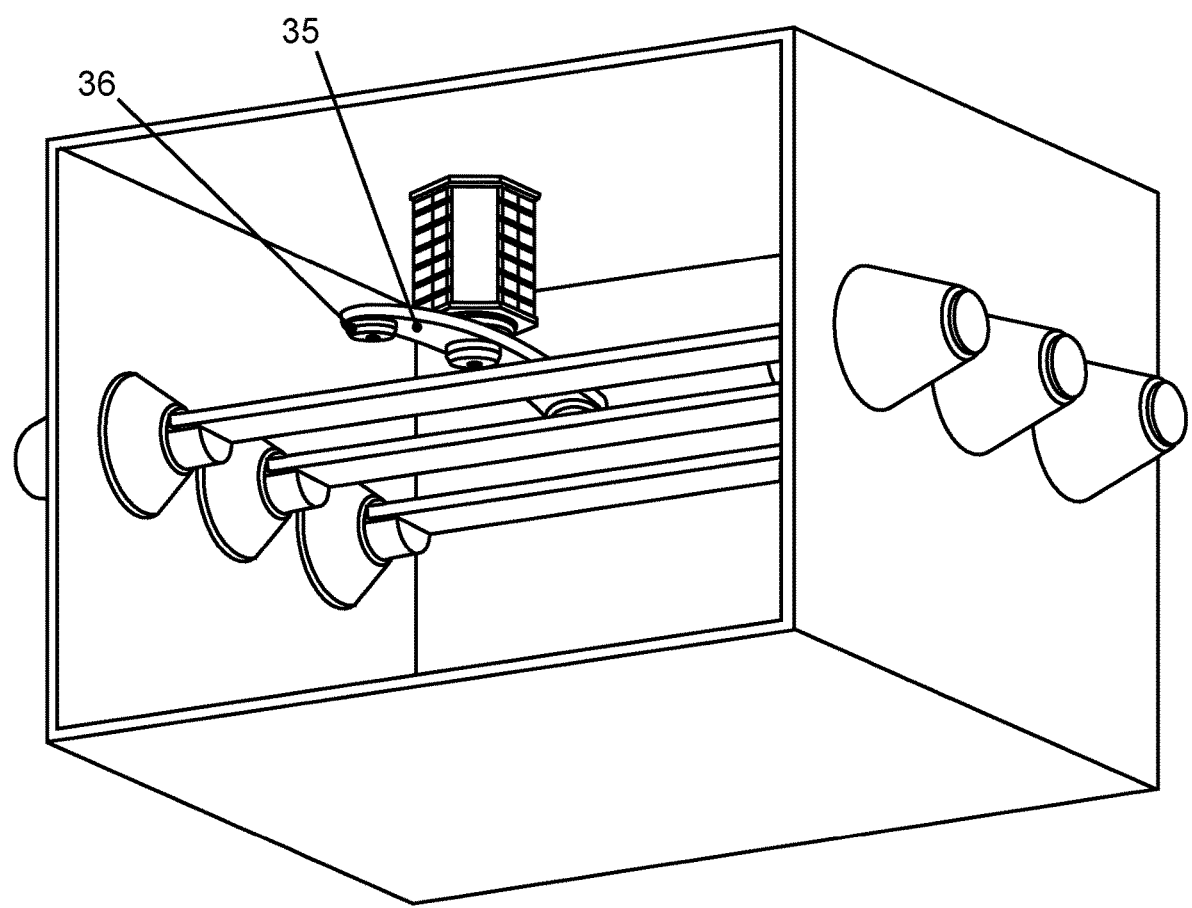
FIGS. 5 and 6 show examples of an earthing module in a part of a switchgear, in standby and released positions.
Figure 6:
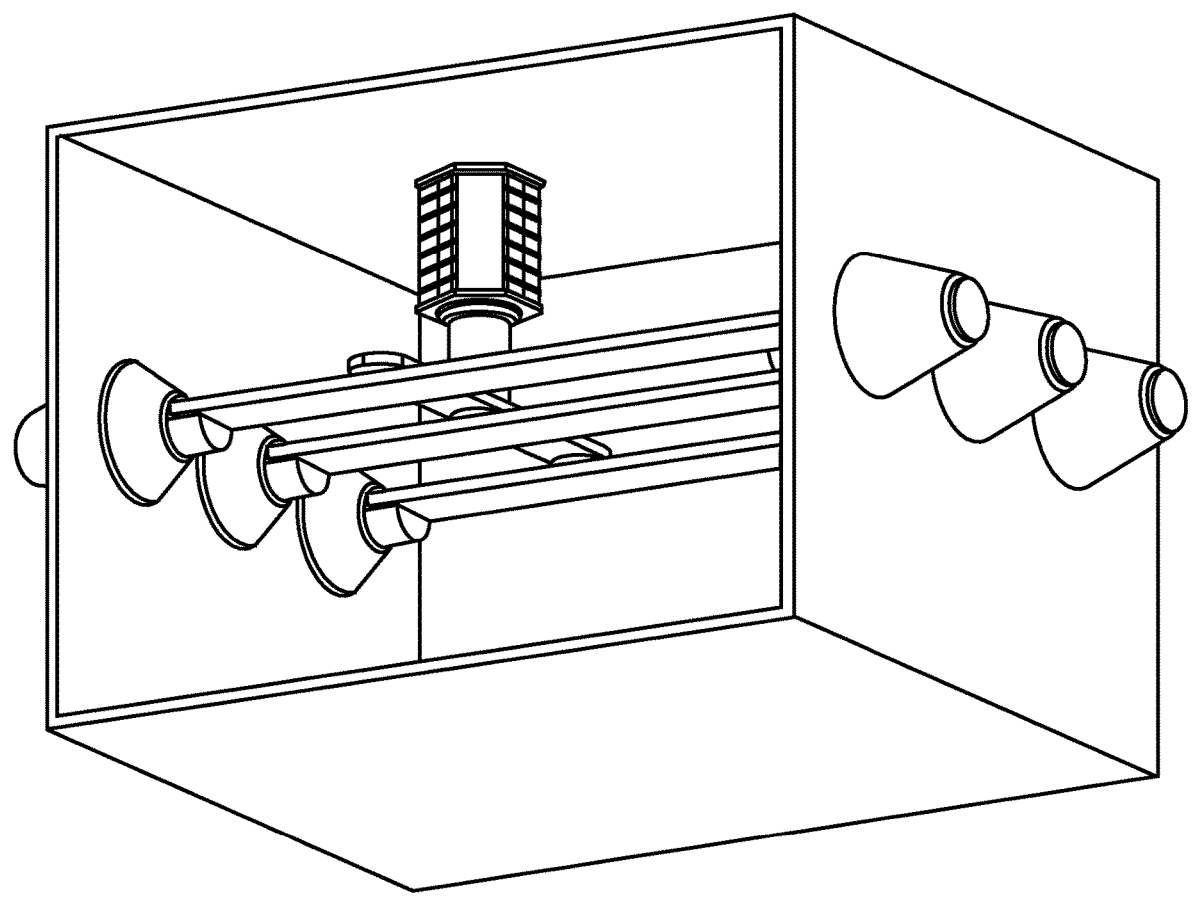

FIGS. 5 and 6 show a further embodiment, where one independent earthing module is used for three phases, using a contact bridge 35 with a separate contact piece 36 for contacting each individual busbar in the released state of the independent earthing module. Twist protection can be associated with the bridge to ensure that it is always hits all busbars in case of need, and does not twist out of alignment. The twist protection can be inside or outside of the independent earthing module 1. The twist protection can be as that used in state of the art devices. The contact bridge 35 can be slightly bent as shown in FIG. 5. When the independent earthing module is released and the piston is internally locked by the conical shapes 12 and 22, the contact bridge 35 is bent back flatly, as can be seen in FIG. 6. The force that is acting to keep this back-bending stable increases at the same time the contact force on the lateral busbars that are not located directly under the piston of the independent earthing module, so that the short circuit current can be carried without arcing. The material of the contact bridge 35 is an electrically conductive material like copper or aluminum. Aluminum is advantageous because of its relatively low mass; this eases the mechanical acceleration of the movable parts of the independent earthing module and reduces the requirements for the stored energy unit.

Figure 7:
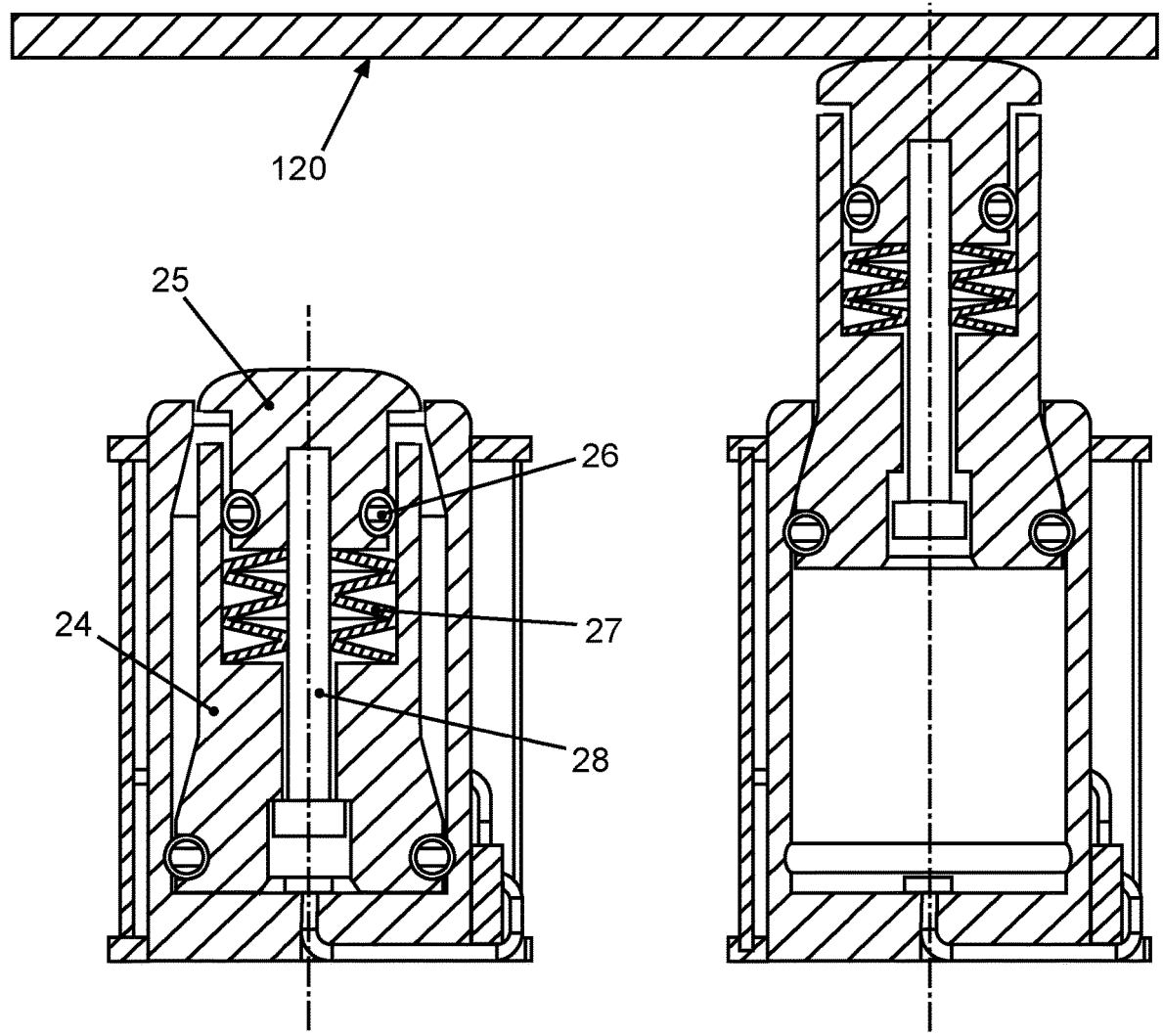
FIG. 7 shows an example of an earthing module in standby and released positions.

Another embodiment of the earthing module is shown in FIG. 7. Here, the contact force is controlled by internal springs in the piston. The piston is here separated into two main parts, the lower part 24 and the upper part 25. In the standby position, as shown in FIG. 7, the spring 27, which can for example be a pre-charged stack of disk springs, pushes the upper part 25 away from the lower part 24. This pushing is limited by the screw 28, which is screwed and tightened firmly into an internal thread of the upper part 25. The head of the screw 28 rests on the corresponding groove of the lower part 24 of the piston. The electrical connection between the lower part 24 and the upper part 25 is released with a slidable electrical contact 26, which can for example be a spiral contact. In the released position of the independent earthing module, as shown in FIG. 7, the stored energy unit has driven the piston towards the busbar 120 until the conical shapes of the piston and the cylinder have stopped the motion and self-locked the piston. Due to the dimensions of the overall design, the upper part 25 of the piston is further compressing the spring 27, i.e. the force of the spring is acting as a contact force for the electrical earthing connection. The head of the screw 28 is therefore no longer resting on 24.

Figure 8:
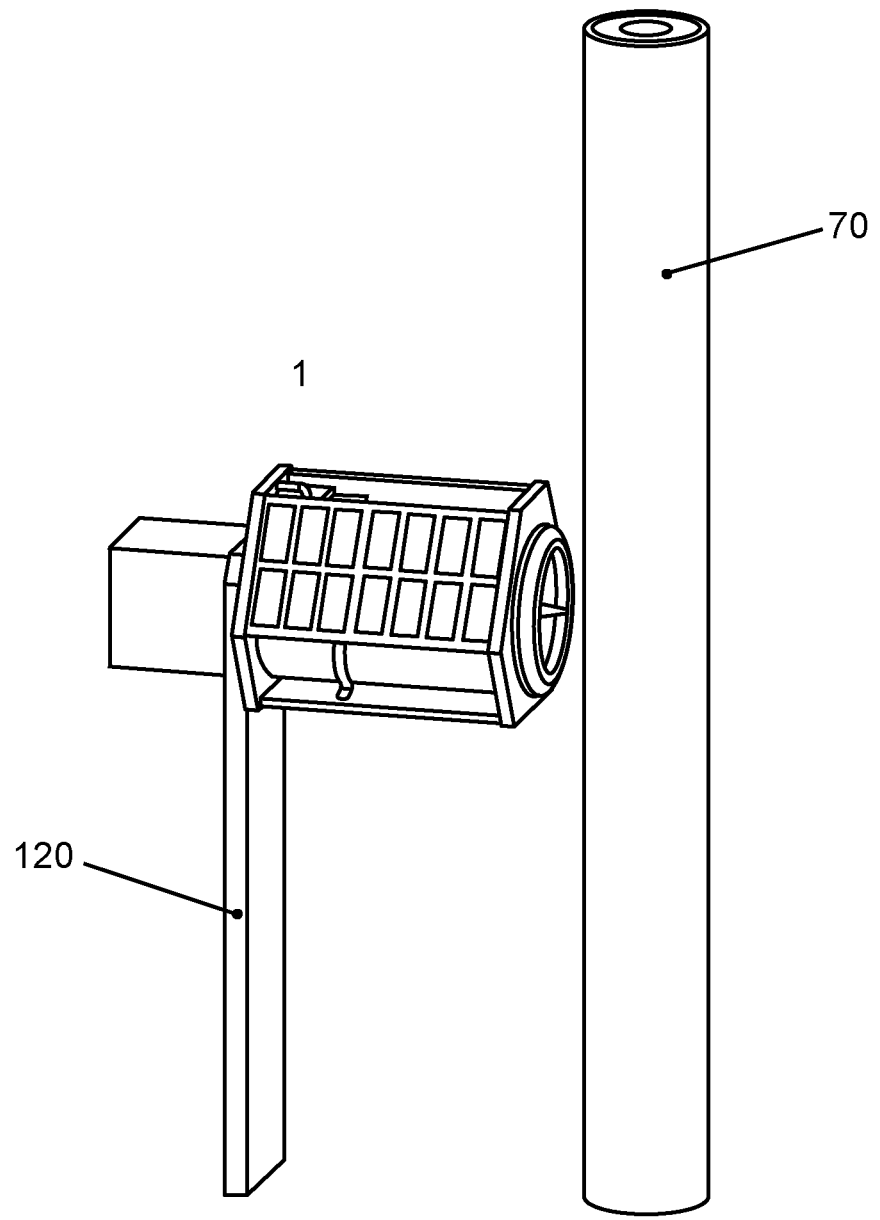
FIG. 8 shows an example of an earthing module.
Figure 9:
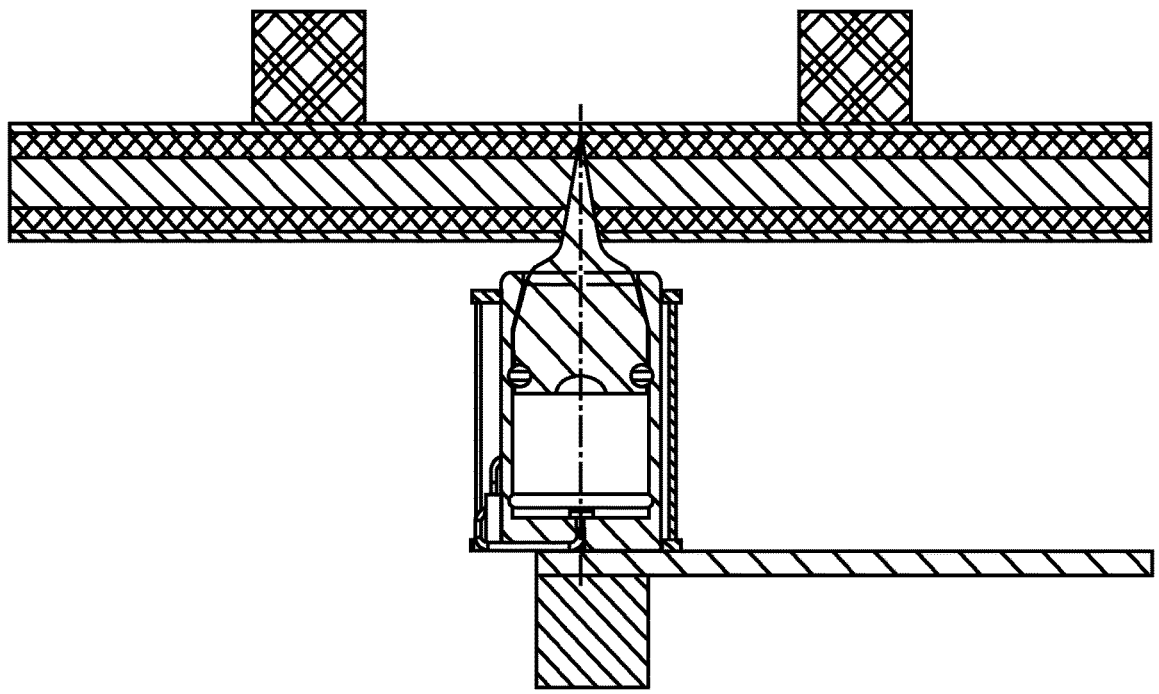
FIG. 9 shows an example of the earthing module of FIG. 8 in standby and released positions.
Figure 9:
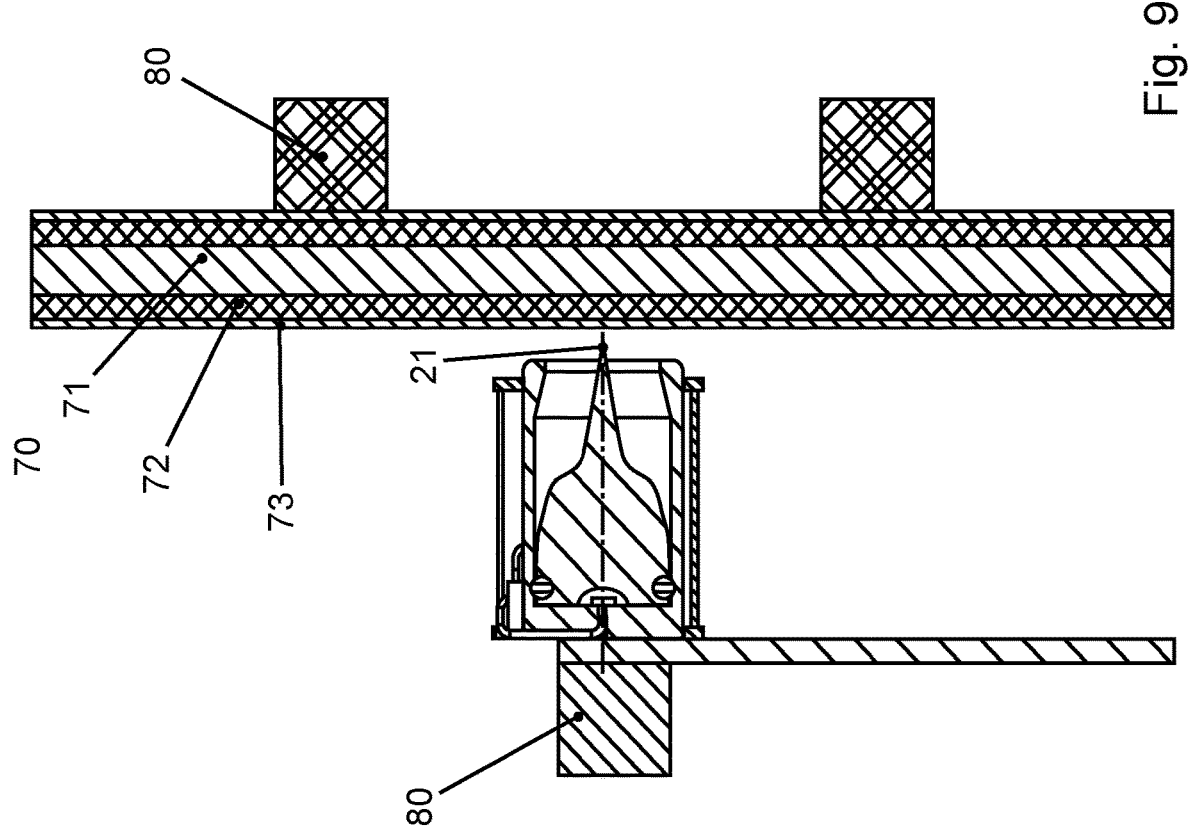

Another embodiment of the earthing module is shown in FIGS. 8 and 9. Here, the independent earthing module 1 is located in the vicinity of a cable 70, for example in the cable compartment of an air insulated switchgear (AIS) or in any other cable channel. The tip 21 of the piston 20 is pointed. When the stored energy unit is released by the excessive light of a fault arc in the vicinity, the piston can intrude into the cable as shown in FIG. 9. The required energy can be adjusted by choosing an appropriate type of stored energy unit. The piston will pierce both the earthed layer 73 and the insulation 72, and it will finally contact, and earth, the main conductor 71 of the cable and so quench the fault arc. Mechanical supports 80 can be provided in a way that the cable 70 cannot easily retreat from the intruding tip 21. The cable will be bent aside only to a certain amount, so that the cable will act as a spring that ensures the required contact pressure.

Figure 10:
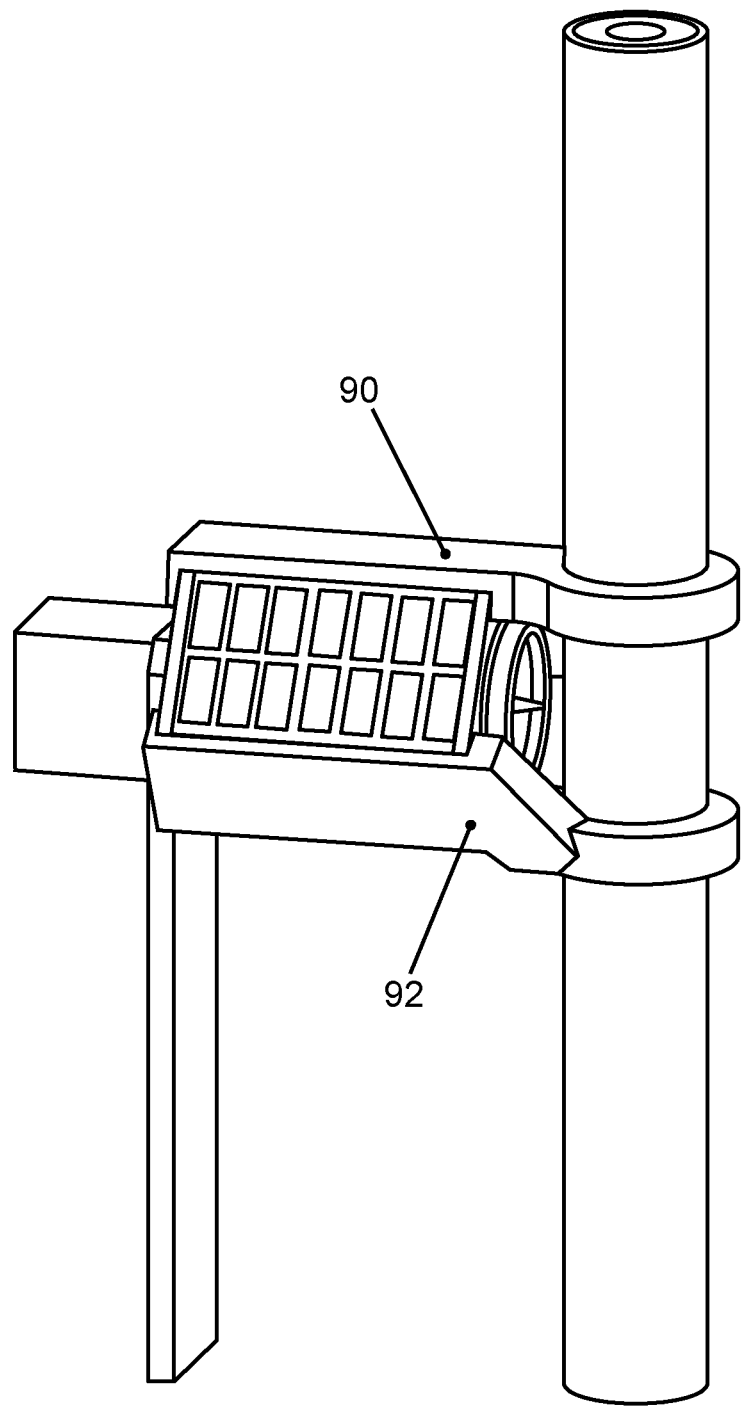
FIG. 10 shows an example of an earthing module.

Alternatively, the independent earthing module can directly be coupled to the cable by clamps 90, 91 as shown in FIG. 10. The clamps are fixedly connected to the independent earthing module for example by screws or snap-fits. The cable 70 leads through openings in the clamps. For the assembly of the clamps around the cable, the loops can be opened and closed, for example by using separate parts that can be closed with screws or by using zip ties. It is important that the clamps do not significantly cover the photovoltaic cells.

In the situation when several cables are installed closely to each other, it is also possible to use one independent earthing module with one stored energy unit and a contact bridge similar to the contact bridge 35 shown in FIGS. 5 and 6 with three pointed or spiked tips to simultaneously earth more than one cable with only one independent earthing module. Clamps similar to clamps 90 and 91 can be designed to encompass the independent earthing module and all targeted cables.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

1 Independent earthing module
10 Cylinder
12 Conical shape at the inner side of 10
14 Groove in 10
16 Bottom side of 10
17 Groove in 16
20 Piston
21 Tip of piston
22 Conical shape at the outer side of 20
24 Lower part of separated piston
25 Upper part of separated piston
26 Slidable electrical contact of separated piston
27 Spring of separated piston
28 Screw of separated piston
30 Slidable electrical contact
35 Contact bridge
36 Contact piece
40 Stored energy unit
42 Electrical wiring of stored energy unit
50 Photovoltaic cell
52 Electrical wiring of 50
55 Mechanical support, bottom side
56 Mechanical support, top side
60 Electrical connection block
70 Cable
71 Main conductor of 70
72 Insulating layer
73 Earthed layer
80 Mechanical support of 70 and 120
90 Upper clamp
91 Lower clamp
100 Sample compartment
110 Enclosure
120 Busbar
130 Bushing

What is claimed is:

1. An earthing module for a switchgear, the earthing module comprising:
a cylinder;
a piston;
a stored energy unit; and
at least one photovoltaic cell,
wherein the cylinder is configured to connect to a part of a switchgear at earth potential,
wherein the piston is configured to move within the cylinder from a standby position to a released position along an axis of the cylinder,
wherein, when in the released position, the piston is configured to be in electrical connection with the cylinder,
wherein the stored energy unit is located within or associated with the earthing module such that activation of the stored energy unit is configured to move the piston from the standby position to the released position, and wherein one or more of the at least one photovoltaic cell is configured to activate the stored energy unit based on radiation from an electrical arc of the switchgear impinging upon the one or more of the at least one photovoltaic cell.

2. The earthing module of claim 1, wherein a tip of the piston, when in the released position, is configured to make an electrical connection with at least one current carrying part of the switchgear.

3. The earthing module of claim 2, wherein the tip of the piston comprises a point.

4. The earthing module of claim 2, wherein the tip of the piston is configured such that as the piston moves from the standby position to the released position, the tip intrudes through an earthed layer and insulation of a cable to make electrical contact with a main conductor of the cable.

5. The earthing module of claim 2, wherein the tip comprises a contact bridge with two or more contact pieces, and
wherein each contact piece of the two or more contact pieces is configured to make electrical connection with a different current carrying part of the switchgear when the piston is in the released position.

6. The earthing module of claim 2, wherein the tip of the piston is disposed within a part of the piston that is moveable with respect to the rest of the piston, and
wherein the earthing module further comprises a spring configured to push the moveable part of the piston away from a rest of the piston.

7. The earthing module of claim 6, wherein a movement of the moveable part of the piston away from the rest of the piston is limited.

8. The earthing module of claim 7, wherein the movement is limited via a screw that connects the moveable part of the piston to the rest of the piston.

9. The earthing module of claim 6, wherein the piston is configured such that when the moveable part of the piston moves with respect to the rest of the piston, an electrical connection is maintained between the moveable part of the piston and the rest of the piston.

10. The earthing module of claim 9, wherein the electrical connection is maintained via a slidable contact.

11. The earthing module of claim 1, wherein gas from the stored energy unit is configured to move the piston from the standby position to the released position upon activation of the stored energy unit.

12. The earthing module of claim 1, wherein the stored energy unit comprises a micro gas generator or a pressurized gas container.

13. The earthing module according claim 1, wherein the stored energy unit comprises one or more springs, and
wherein expansion of the one or springs is configured to move the piston from the standby position to the released position upon activation of the stored energy unit.

14. The earthing module of claim 1, wherein the piston comprises an electrical contact that is configured to slide along an inner surface of the cylinder and make an electrical connection between the piston and the cylinder.

15. The earthing module of claim 14, wherein the electrical contact is configured to maintain the electrical connection when the piston moves from the standby position to the released position.

16. The earthing module of claim 14, wherein the cylinder comprises a groove configured to accommodate the electrical contact when the piston is in the standby position.

17. The earthing module of claim 16, wherein the groove and electrical contact are configured to lock the piston in the standby position until activation of the stored energy unit.

18. The earthing module of claim 1, wherein the piston and cylinder are configured such that in the released position a portion of an outer surface of the piston is in contact with a portion of an inner surface of the cylinder.

19. The earthing module of claim 18, wherein the portion of the outer surface of the piston and the portion of the inner surface of the cylinder are shaped such that in moving from the standby position to the released position the piston is locked in the released position.

20. The earthing module of claim 18, wherein the portion of the outer surface of the piston is conically shaped and the portion of the inner surface of the cylinder is conically shaped.

21. The earthing module of claim 1, wherein the at least one photovoltaic cell is mounted to a wall of the cylinder with active surfaces facing outwards from the axis of the cylinder.

22. The earthing module of claim 1, wherein a rated voltage of the at least one photovoltaic cell is equal to a rated voltage of a triggering device of the stored energy unit.

23. The earthing module of claim 1, wherein the at least one photovoltaic cell and the stored energy unit are configured such that radiation below a threshold intensity level is not sufficient to activate the stored energy unit.

24. The earthing module claim 1, further comprising:
an electrical connection block that connects cables of the at least one photovoltaic cell to cables of the stored energy unit.

25. The earthing module of claim 24, wherein the electrical connection block comprises an electrical threshold switch configured to inhibit relatively small currents from activating the stored energy unit, and/or
wherein the electrical connection block comprises an electrical time filter configured to inhibit very short disturbances from activating the stored energy unit.

26. The earthing module of claim 1, wherein the earthing module comprises a current sensor configured to detect a current in a vicinity of the earthing module.

27. The earthing module of claim 26, wherein the current sensor comprises a hall sensor, a reed sensor, or a coil.

28. The earthing module of claim 1, wherein the at least one photovoltaic cell is covered with a removable opaque covering.

29. The earthing module of claim 28, wherein the opaque covering comprises a colored portion.

30. The earthing module of claim 28, wherein the opaque covering comprises foil.

31. A switchgear, comprising:
one or more earthing modules of claim 1.

* * * * *